United States Patent Office.

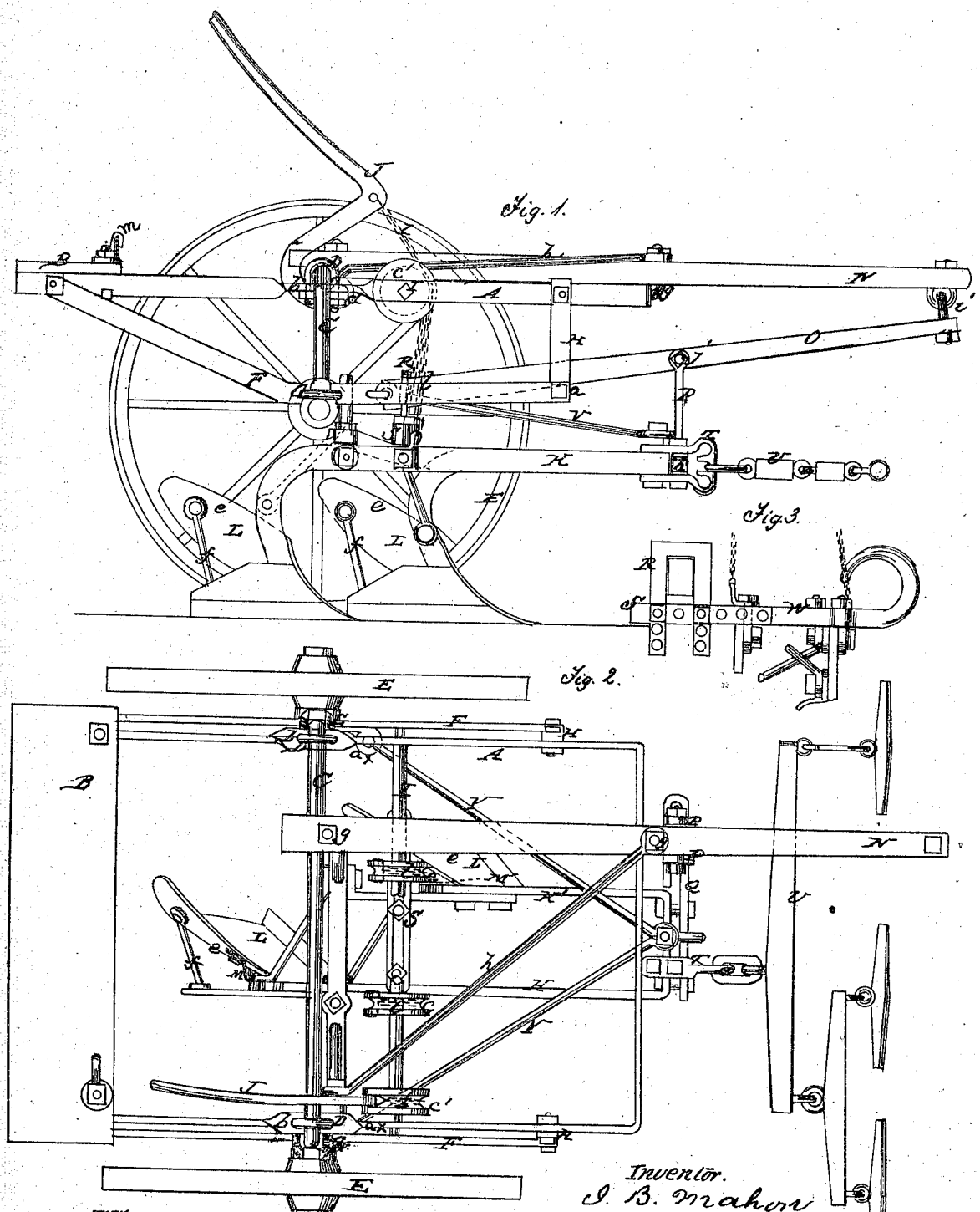

ISAAC B. MAHON, OF DUNKIRK, OHIO.

Letters Patent No. 75,941, dated March 24, 1868.

---

IMPROVEMENT IN CULTIVATOR AND GANG-PLOUGH.

---

*The Schedule referred to in these Letters Patent and making part of the same.*

---

TO ALL WHOM IT MAY CONCERN:

Be it known that I, ISAAC B. MAHON, of Dunkirk, in the county of Hardin, and State of Ohio, have invented a new and improved Cultivator and Gang-Plough; and I do hereby declare that the following is a full, clear, and exact description thereof, which will enable those skilled in the art to make and use the same, reference being had to the accompanying drawings, forming part of this specification.

This invention relates to a new and improved cultivator and gang-plough, and is an improvement on a cultivator patented by me, September 17, 1867.

The object of the present invention is to render the previous-patented invention susceptible of being adapted as a gang-plough, and to economize in the construction of the machine generally, and to render it more strong and durable. In the accompanying sheet of drawings—

Figure 1 is a side view of my invention, the wheel of the device at the side nearest the eye being removed.
Figure 2, a plan or top view of the same.
Figure 3, a rear view of a portion of the same.
Similar letters of reference indicate corresponding parts.

A represents the frame of the machine, which consists of a single wrought-iron rectangular or flat bar, bent so as to form three sides of a quadrangle; the open end or part being at the rear, and connected by a wooden seat-board, B. C is the axle, which may be constructed of a square or round iron bar, secured transversely on the frame A by clamps D, and bent downward at right angles at the outer side of the frame, with spindles formed to the lower parts of the bent ends, on which spindles the wheels E work. Both the frame and the axle are braced by curved bars F, the rear ends of which are bolted to the rear of the frame A, secured at about their centres to the lower parts of the bent ends of the axle by clamps G, and attached at their front ends by bolts $a$ to the lower ends of pendants H, the upper ends of which are bolted to the sides of the frame A. The sides of the frame A, at the points through which the clamps D pass, are twisted, so that their broad, flat sides will be uppermost, as shown at $b$ in fig. 2, and afford abundant space for the clamps to pass through without weakening the frame.

The frame constructed in this manner is extremely light, strong, and durable; the bars composing the same are not weakened by a multiplicity of bolts, and it may be constructed at a small cost.

In the frame A, directly in front of the axle C, there is a shaft, I, which has three pulleys $c$ $c$ $c'$ keyed upon it. The pulley $c'$ has a chain, $l$, attached, which is connected to a curved lever, J. The shape of this lever is shown clearly in fig. 1, and it will be seen that the curvature is such that the fulcrum-pin $d$ may be attached to one side of the frame A in front of the axle C, and the main portion of said lever be lowered behind the axle.

By this arrangement, a good sweep of the lever may be obtained, and the ploughs, hereinafter described, raised higher than usual.

K K' are two plough-beams, both of which are formed out of a single rectangular bar, bent so as to form three sides of a quadrangle; the beams K K' being the sides thereof, and K somewhat longer than K'. The rear part of each beam is curved downward to form a standard, to which the ploughs L are attached; one plough, in consequence of one beam being longer than the other, being in advance of the other. The ploughs are firmly stayed or braced in position by angle-pieces M, secured to the mould-boards $e$, and to the beams, (see fig. 2,) and the ploughs are further braced by rods $f$ attached to the mould-boards and beams.

N represents the draught-pole, which is secured to the frame A and axle C by curved or hooked bolts $g$ $g$, and braced by one or more rods $h$. It is designed to have this draught-pole attached in such a manner that it may be shifted and secured at different points on the frame.

Underneath the draught-pole there is a wooden beam, O, the front end of which is attached, by a link-joint, $i$, to the under side of the draught-pole. This beam O extends backward underneath the frame A, and is secured, by a horizontal bolt, $j$, in the upper parts of uprights P P; the lower ends of the latter being secured by bolts $k$ in a horizontal socket, Q, attached to the front of the beams K K'; said socket having a series of holes made through it to admit of the uprights P being adjusted laterally to correspond to the position of the draught-pole.

The rear end of the beam O is fitted in or passes through a guide, R, which is fitted in a socket, S, attached to the rear part of the beams K K', and this guide may be adjusted laterally in the socket S, in the same way as the uprights P P are adjusted in their socket, in order that the beam O may be adjusted in line with the draught-pole N.

To the front part of the beams K K', a clevis, T, is attached, which also may be adjusted laterally to conform to the position of the draught-pole. This clevis has the splinter-bar U attached, which may have two or more whiffle-trees connected to it, according to the number of draught-horses to be applied—two or more. The shifting of the draught-pole and clevis admits of the application of either two or more horses to the machine, as desired.

The front part of the beams K K' are stayed by oblique brace-rods Y Y, as shown clearly in fig. 2. The oblique brace-rods Y Y perform an important function, as they not only hold the front ends of the plough-beams, but also serve as a draught-attachment for the carriage, as they constitute the only connection between the team and the carriage. The rear ends of the rods Y Y are connected to the carriage by having their inner ends hooked into eyes $a^\times$ on the clamps G.

The feet of the driver rest in loops formed at the ends of a bar, W, attached to the rear parts of the beams, and the latter have chains $l$ attached, which are connected to the pulleys $c\ c$, so that, by turning the shaft I through the medium of the lever J, the ploughs may be raised out of the ground when desired, and held up out of the ground by placing the lever J under a hook, $m$, attached to the seat-board B.

By connecting the ploughs L L to the frame or carriage of the machine, as shown and described, the carriage is allowed to rise and fall independently of the ploughs, and the latter are made to plough furrows of a uniform depth when working or passing over uneven ground. This is an important feature of the invention.

I claim as new, and desire to secure by Letters Patent—

1. Constructing the frame A of a single bar, bent so as to form three sides of a quadrangle, and braced by the bars F applied to the frame and axle, substantially in the manner as and for the purpose set forth.

2. The construction of the plough-beams K K', arranged with and applied to the main frame A to operate in the manner as and for the purpose herein set forth.

3. The bar W, applied to the beams K K', substantially as and for the purpose specified.

4. The oblique draught or brace-rods Y Y', applied to the carriage, and to the plough-beams, substantially in the manner as and for the purpose set forth.

5. The beam O, attached to the draught-pole, and connected with the plough-beams, in the manner substantially as and for the purpose herein set forth.

ISAAC B. MAHON.

Witnesses:
    CHARLES M. JONES,
    ISAAC GRINER.